United States Patent [19]

Osumi et al.

[11] 4,147,536

[45] Apr. 3, 1979

[54] ALLOY FOR OCCLUSION OF HYDROGEN

[75] Inventors: Yasuaki Osumi, Minou; Hiroshi Suzuki, Ikeda; Akihiko Kato, Matsubara; Masanori Nakane, Takatsuki; Yoshizo Miyake, Toyonaka, all of Japan

[73] Assignees: Agency of Industrial Science & Technology; Ministry of International Trade & Industry, both of Tokyo, Japan

[21] Appl. No.: 841,131

[22] Filed: Oct. 7, 1977

[30] Foreign Application Priority Data

Oct. 16, 1976 [JP] Japan ................................ 51-124055

[51] Int. Cl.$^2$ ............................................. C22C 19/00
[52] U.S. Cl. ..................................... 75/134 F; 34/15; 75/152; 75/170; 423/644
[58] Field of Search ..................... 75/170, 134 F, 152; 34/15; 423/644

[56] References Cited

U.S. PATENT DOCUMENTS 3,825,418  7/1974  Reilly et al. ........................... 75/170

Primary Examiner—R. Dean
Attorney, Agent, or Firm—Kurt Kelman

[57] ABSTRACT

An alloy comprising Mischmetal, cobalt and nickel is effectively usable for occlusion of hydrogen.

4 Claims, No Drawings

ALLOY FOR OCCLUSION OF HYDROGEN

BACKGROUND OF THE INVENTION

This invention relates to an alloy useful for occluding hydrogen in the form of a hydride for the convenience of transportation and storage of hydrogen.

Hydrogen which can be derived from water as the raw material is available in almost infinite quantitites, is clean, is capable of easy transportation and storage and does not through its use disturb the cycles of nature. Because of these advantages, it has come to arrest keen attention as a highly potential fuel of the coming era to take the place of fossil fuels. The time is likely to come when hydrogen is used in huge quantities and in diversified ways. As a consequence, it will become necessary for the supply of hydrogen to satisfy all types of demand without reference to the quantities required or geographical locations. In this connection, the techniques available for the transportation and storage of hydrogen will gain immeasurably in significance.

Among the methods now available for the transportation and storage of hydrogen, there are included those whereby hydrogen is transported and stored in the form of gaseous hydrogen or liquefied hydrogen and those whereby hydrogen is transported and stored in the form of a metal hydride.

Techniques for transporting and storing hydrogen in liquid and gaseous forms have already reached an acceptable, if not ideal, state of development. However, these techniques necessitate use of highly pressureproof facilities and, further, inevitably dictate exercise of great precaution against the hazards arising from the use of elemental hydrogen.

As a technique far advanced over those described above for handling gaseous and liquid hydrogen, the methods which handle hydrogen in the solidified form of a metal hydride have come to attract increasing attention.

The qualities required of a hydrogen occluding metal hydride to be used for transporting and storing hydrogen (such metal hydrides will hereinafter be referred to simply as hydrogen storing materials) can be listed as follows: (1) it must be an occluding metal or alloy which is cheap and abundantly available; (2) it must have a large storage capacity for hydrogen; (3) it must be stable at and near room temperature and have a proper dissociation equilibrium pressure; (4) its hydrogen occluding and liberation reactions must be reversible and progress rapidly and; (5) it must be light of weight.

The materials heretofore recognized as useful for storage of hydrogen by occlusion include a magnesium-nickel alloy [J. J. Reilly, R. H. Wiswall, Jr.: Inorganic Chemistry, 7, 2254 (1968)], a lanthanum-nickel alloy [J. H. N. van Vucht, F. A. Kuijpers, H. C. A. M. Brunning: Philips Research Reports, 25, 133 (1970)] and a titanium-iron alloy [J. J. Reilly, R. H. Wiswall, Jr.: Inorganic Chemistry, 13, 218 (1974)] and the like. Of these alloys, the magnesium-nickel alloy enjoys a relatively large capacity for occlusion of hydrogen per unit weight of the alloy and yet has a disadvantage that the temperature required for the occlusion and liberation of hydrogen is high. In contrast, the lanthanum-nickel alloy and the titanium-iron alloys have low temperatures for the occlusion and liberation of hydrogen. They nevertheless are not completely free from problems which render their actual use disadvantageous such as that the metals contained therein, i.e. titanium, iron, lanthanum and nickel should possess very high purity and the hydrogen itself to be occluded thereby should possess high purity and that the component "lanthanum" is expensive and requires much time for activation. A metal or an alloy which satisfies all the requirements expected to be met by an ideal material capable of providing advantageous occlusion of hydrogen remains yet to be discovered.

The inventors formerly invented alloys of Mischmetal (Mm) with nickel or cobalt as material capable of occlusively storing hydrogen in the form of a hydride and a method for the use of said alloys and applied for Japanese patent on the invention (Japanese Patent Application No. 52927/1975). These alloys enjoy an outstanding characteristic that they are inexpensive, their temperatures for occlusion and liberation of hydrogen are low and the density of hydrogen is practically the same as that of liquefied hydrogen. Comparison of Mischmetal-nickel alloy ($MmNi_5$) and Mischmetal-cobalt alloy ($MmCo_5$) in terms of the maximum capacity for hydrogen occlusion (1.5% by weight for $MmNi_5$ and 0.7% by weight for $MmCo_5$) and the dissociation equilibrium pressure (14 atmospheres for $MmNi_5$ and 0.8 atmosphere for $MmCo_5$) reveals that $MmNi_5$ hydride contains a large quantity of occluded hydrogen and exhibits a high dissociation equilibrium pressure at room temperature while $MmCo_5$ hydride contains a small quantity of occluded hydrogen and exhibits a low dissociation equilibrium pressure. Thus, they have mutually contradictory properties. These peculiar characteristics may possibly pose a serious problem, depending on the conditions under which they are actually put to use.

A primary object of the present invention is to provide Mischmetal-containing alloys which have a large capacity for occlusion of hydrogen, permit hydrogen to be occluded therein at a high density, produce hydrides possessed of a proper dissociation equilibrium pressure, possess an ability to liberate hydrogen under mild conditions and prove to be highly advantageous for the practical purpose of stationary storage and transportation of hydrogen.

SUMMARY OF THE INVENTION

To attain the object described above, the inventors studied various multi-component alloys of Mischmetal, nickel, cobalt, etc. and investigated their properties to determine their usability as materials for advantageous occlusion of hydrogen. They have consequently found that a multi-component alloy obtained by substituting a part of the nickel component of a Mischmetal-nickel alloy ($MmNi_5$) with cobalt and represented by the following formula has an excellent ability to occlude hydrogen.

$$MmNi_{5-x}Co_x$$

(wherein, Mn represents Mischmetal and X a positive number having the value of from 0.1 to 4.9). And the hydride which said alloy forms by occluding hydrogen therein is represented by the following formula:

$$MmNi_{5-x}Co_xH_y$$

(wherein, Mm and X are as defined above and Y represents a number having the value of not more than 7).

Said hydride is a novel composition, has an extremely large capacity for occlusion of hydrogen per unit weight of the alloy and, upon proper combination of temperature and pressure, liberates hydrogen rapidly in a large quantity.

This hydride can be formed in any composition within the range indicated by the formula given above and, through control of the composition, can be made to acquire desired properties for occlusion and liberation of hydrogen.

DETAILED DESCRIPTION OF THE INVENTION

The alloy of the present invention represented by the generic formula, $MmNi_{5-X}Co_X$ (wherein, Mm is Mischmetal and X a number having the value of from 0.1 to 4.9), has the following characteristics:

(1) The ability to occlude hydrogen is greater than that of $MmCo_5$ and is not inferior to that of $MmNi_5$.

(2) The alloy occludes hydrogen in the neighborhood of room temperature and consequently converts itself into a hydride. The hydride liberates hydrogen at a temperature slightly higher than room temperature.

(3) In the neighborhood of room temperature, the hydride is possessed of a proper dissociation equilibrium pressure.

(4) For the hydride, the heat of formation is small.

(5) Occlusion of hydrogen by the alloy and liberation of hydrogen by the hydride both proceed at high rates of speed. No matter how often the alternate occlusion and liberation of hydrogen may be repeated, no discernible degradation occurs in the properties of the hydride.

(6) The alloy has a large density so that when used as a container for hydrogen it can store a large amount of hydrogen in a small space.

(7) The properties of the alloy for occlusion and liberation of hydrogen can be continuously varied by the control of the percentage composition of the alloy. In other words, the percentage composition can easily be selected so as to suit the particular purpose for which the alloy is used. Now, the composition of the alloy of the present invention will be described.

The Mischmetal involved in this invention is a mixed light rare earth metal additionally containing therein about 5% of iron and a total of about 2% of magnesium, aluminum, silicon, etc. More strictly, the Mischmetal is defined as a mixture which generally consists of 25 to 35% of lanthanum (La), 40 to 50% of cerium (Ce), 4 to 15% of praseodymium (Pr) and 4 to 15% of neodymium (Nd) as essential components, and often contains not more than a total of 1 to 7% of samarium (Sm) and gadolinium (Gd) and further contains one or more elements such as the following which pass into the mixture entrained by the raw materials for said rare earth elements: 0.1 to 5% of iron (Fe), 0.1 to 1% of silicon (Si), 0.1 to 2% of magnesium (Mg) and 0.1 to 1% of aluminum (Al) respectively by weight ratio. Various forms of Mischmetal are commercially available at prices decidedly lower than rare earth elements on the market.

The forms of the alloy of the present invention which can be advantageously used for the occlusion of hydrogen will be enumerated below by way of example.

(1) An alloy of the aforementioned formula wherein Mm comprises, by weight ratio, 25 to 30% of La, 40 to 45% of Ce, 10 to 15% of Pr, 4 to 5% of Nd, 4 to 7% of Sm+Gd, 3 to 5% of Fe, 0.1 to 1% of Si, 0.1 to 2% of Mg and 0.1 to 1% of Al and X has the value of 2.0.

(2) An alloy of the aforementioned formula wherein Mm is the same as in (1) above and X has the value of 2.5.

(3) An alloy of the aforementioned formula wherein Mm is the same as in (1) above and X has the value of 3.0.

(4) An alloy of the aforementioned formula wherein Mm is the same as in (1) above and X has the value of 4.0.

(5) An alloy of the aforementioned formula wherein Mm is the same as in (1) above and X has the value of 4.9.

The characteristics exhibited and the uses found for the compositions described above are listed below.

| Characteristics | Uses |
|---|---|
| 1) Large capacity for occlusion of hydrogen. | 1) Stationary storage tank for hydrogen. |
| 2) Proper dissociation equilibrium pressure obtained around room temperature. | 2) Household container for hydrogen. |
| 3) Small heat of formation. | 3) Device for storage of solar energy. |
| 4) Occlusion and liberation of hydrogen obtained at high rates of speed. | 4) Device for refining hydrogen. |
| 5) Repetitions of occlusion and liberation cycles obtained without degradation of properties. | 5) Tank for transportation of hydrogen. |
| 6) Use of containers of small dimensions and simple design suffices. | 6) Tank for storage of hydrogen for use on automible. |
| 7) Prolonged storage of occluded hydrogen permissible. | |
| 8) Transportation and storage of hydrogen obtained without reference to size of operation scale. | |
| 9) Hydrogen of high purity obtainable by occlusion and liberation with the alloy. | |
| 10) The equipment involved is inexpensive. | |

Now, the method followed for the manufacture of the alloy of this invention will be described.

Mischmetal, nickel and cobalt are mixed in amounts to give a percentage composition required for the intended use and the resultant mixture is subjected to arc fusion. To be more specific, an alloy of the formula $MmNi_{5-X}Co_X$ having the value of X selected from the indicated range so as to suit the intended use is easily produced by mixing Mischmetal, nickel and cobalt in a powdery form or suitably molded form (usually in the form of bars) in respective amounts to give a percentage composition conforming to said formula, molding the resultant mixture in a desired shape by means of a press, placing the molded mixture in an arc furnace, heating to fuse it under the atmosphere of an inert gas, and allowing the fused mixture to cool off.

Subsequently, the alloy so produced is activated. The "activation" means a process in which the gases and moisture adsorbed on the alloy during the preparation and pulverization of alloy are expelled by heating under a vacuum, the oxide coat formed on the alloy is reduced by high-pressure hydrogen, and the alloy is therefore subjected to repeated cycles of occlusion and liberation of hydrogen so as to acquire finally enhanced properties for the occlusion and liberation of hydrogen. The activation is now described with reference to a typical example: An alloy manufactured as described above is pulverized to a particle size of 120 mesh, placed in a reactor, heated at 200° C. under diminished pressure so as to be deprived of gas, cooled to room temperature, and then sealed in an atmosphere of hydrogen 50 kg/cm² in pressure. During the standing, the mass of pulverized alloy occludes hydrogen. Subsequently, the reaction system is evacuated and the alloy is again left to stand at room temperature to effect the occlusion of hydrogen once again. Two cycles of such occlusion and liberation of hydrogen suffice for the purpose of bringing to completion the activation of the alloy.

The method by which the activated, pulverized alloy is caused to occlude hydrogen therein will now be described.

Occlusion of hydrogen is accomplished by allowing the alloy to stand in an atmosphere of hydrogen at a temperature selected in the range of from −30° C. to room temperature under a pressure prescribed for the selected temperature, with the result that the alloy forms a hydride of the following formula:

$$MmNi_{5-X}Co_XH_Y$$

(wherein, Mm represents Mischmetal, X a number of the value of from 0.1 to 4.9 and Y a number of the value of not more than 7). The pressure of hydrogen applied to the alloy is required to be slightly higher than the dissociation equilibrium pressure of the hydride of this alloy. Concerning the dissociation equilibrium pressure of the hydride of alloy, a typical example is indicated in Table 1 of Example 1 cited hereinafter.

Concrete examples of hydrides to be obtained by application of the pressure of hydrogen of 50 kg/cm² at room temperature are cited below.

$MmNi_{4.9}Co_{0.1}H_{6.5}$
$MmNi_{4.0}Co_{1.0}H_{6.3}$
$MmNi_{3.0}Co_{2.0}H_{6.3}$
$MmNi_{2.5}Co_{2.5}H_{5.2}$
$MmNi_{2.0}Co_{3.0}H_{5.0}$
$MmNi_{1.0}Co_{4.0}H_{4.8}$
$MmNi_{0.1}Co_{4.9}H_{4.6}$

As shown above, hydrogen is occluded in the form of metal hydrides in the Mischmetal-nickel-cobalt alloys.

These metal hydrides can be caused to liberate hydrogen efficiently by heating the hydrides to suitable temperatures exceeding room temperature or lowering the ambient pressure or doing both in a proper combination. This liberation of hydrogen proceeds as the metal hydride is dissociated into the alloy portion $MmNi_{5-X}Co_X$ and the hydrogen portion. By repeating the cycle of reversible conversions, i.e. formation of the hydride and dissociation of the hydride, storage of hydrogen can be carried out as often as desired. Such repetition of the reversible conversions does not result in any discernible degradation of the capacity of the alloy for occlusion of hydrogen.

The speeds at which the alloy of the present invention occludes and liberates hydrogen are extremely high. When the alloy is activated and then left to stand at a temperature falling in the range of from −30° C. to room temperature under a pressure of hydrogen of 50 kg/cm², for example, about one minute's time is required for the quantity of hydrogen occluded by the alloy to reach a substantially constant level. It is about one minute before the hydride of alloy left to stand at room temperature under one atmosphere reaches the state of equilibrium. The impurities, oxygen, nitrogen, argon and carbon dioxide present in the occluded gas are found to exert substantially no discernible effect upon the phenomenon of occlusion.

The alloy of the present invention still has high density after it is converted into a hydride. This means that the storage container constituted of the alloy can be made small. A commercially available pressureproof cylinder for providing effective storage of 7000 liters of hydrogen, has a volume of about 50 liters.

When the same volume of hydrogen is occluded in the form of hydride by using the alloy of the present invention, the volume is only about 1/10 of that mentioned above.

To be more specific, the volume of the alloys of this invention required for storing said amount of hydrogen is:

4.9 liters in the case of the hydride of $MmNi_{4.9}Co_{0.1}$,
5.0 liters in the case of the hydride of $MmNi_{4.0}Co_{1.0}$,
5.1 liters in the case of the hydride of $MmNi_{3.0}Co_{2.0}$,
5.1 liters in the case of the hydride of $MmNi_{2.5}Co_{2.5}$,
6.4 liters in the case of the hydride of $MmNi_{2.0}Co_{3.0}$,
6.8 liters in the case of the hydride of $MmNi_{1.0}Co_{4.0}$,
7.0 liters in the case of the hydride of $MmNi_{0.1}Co_{4.9}$.

These volumes invariably are very small compared with the inner volume of the cylinder mentioned above. The alloy of the present invention, accordingly, has characteristics perfect for the purpose of stationary storage and transportation of hydride.

Now, the present invention will be described with reference to the working examples of the invention. It should be noted that this invention is not limited in any way to these examples.

EXAMPLE 1

Mischmetal comprising by weight 28% of La, 40% of Ce, 14% of Pr, 4% of Nd, 7% Sm+Gd and 5% of Fe was mixed with nickel and cobalt in varying amounts such that the value of X in the formula $MmNi_{5-X}Co_X$ would vary in the prescribed range, to afford alloys of varying compositions. They were pulverized each to a particle size of 120 mesh. A 5.0 g portion of each pulverized alloy was placed in a stainless steel reactor designed for occlusion and liberation of hydrogen. With the reactor connected to an evacuation system, the alloy within was heated at 200° C. under diminshed pressure to effect degasification of the alloy. Then at room temperature, hydrogen having a purity of 99.9999% was introduced into the reactor until the hydrogen pressure within rose to 50 kg/cm². As soon as the alloy was held under this hydrogen pressure, the alloy was seen to start occluding the hydrogen. Subsequently, the interior of the reactor was evacuated at room temperature. The operation for occlusion of hydrogen was performed once again. Through activation of the alloy was attained by a total of two cycles of occlusion and liberation of hydrogen. In the reactor now containing the activated alloy, hydrogen of a purity of 99.9999% was introduced to a pressure slightly higher than the equilibrium pressure and sealed therein. The results obtained of all the alloys are shown in the following table.

Table 1

| | $MmNi_{5-x}Co_x$ | $MmNi_{5-x}Co_xH_y$ | Equilibrium pressure at 20° C. (atm) | Hydrogen content (% by weight) | Heat of formation of Hydride $-\Delta H$ (Kcal/mole $H_2$) | Temperature of hydride formation (°C) | Equilibrium pressure at temperature of hydride formation (atm) | Pressure applied for hydride formation (atm) |
|---|---|---|---|---|---|---|---|---|
| 1 | $MmNi_5$ | $MmNi_5H_{6.5}$ | 14.0 | 1.48 | 6.4 | 20 | 14.0 | 30 |
| 2 | $MmNi_{4.9}Co_{0.1}$ | $MmNi_{4.9}Co_{0.1}H_{6.5}$ | 13.0 | 1.48 | 6.4 | 20 | 13.0 | 30 |
| 3 | $MmNi_{4.0}Co_{1.0}$ | $MmNi_{4.0}Co_{1.0}H_{6.3}$ | 10.0 | 1.43 | 5.6 | 20 | 10.0 | 20 |
| 4 | $MmNi_{3.0}Co_{2.0}$ | $MmNi_{3.0}Co_{2.0}H_{6.3}$ | 4.3 | 1.43 | 8.0 | 20 | 4.3 | 9 |
| 5 | $MmNi_{2.5}Co_{2.5}$ | $MmNi_{2.5}Co_{2.5}H_{5.2}$ | 3.3 | 1.18 | 8.3 | 20 | 3.3 | 8 |
| 6 | $MmNi_{2.0}Co_{3.0}$ | $MmNi_{2.0}Co_{3.0}H_{5.0}$ | 3.0 | 1.14 | 9.0 | 20 | 3.0 | 8 |
| 7 | $MmNi_{1.0}Co_{4.0}$ | $MmNi_{1.0}Co_{4.0}H_{4.8}$ | 2.9 | 1.09 | 9.5 | 20 | 2.9 | 8 |
| 8 | $MmNi_{0.1}Co_{4.9}$ | $MmNi_{0.1}Co_{4.9}H_{4.6}$ | 2.0 | 1.05 | 9.5 | 20 | 2.0 | 5 |
| 9 | $MmCo_5$ | $MmCo_5H_{3.0}$ | 0.8 | 0.69 | 10.0 | 20 | 0.8 | 5 |

The hydrides mentioned above were treated under the conditions indicated in Table 2 below. By the treatment, they were caused to liberate hydrogen and were consequently converted into Mischmetal-nickel-cobalt alloys.

Table 2

| | Conditions of treatment | | | |
|---|---|---|---|---|
| | Temperature (°C) | Pressure (atm) | Time (min) | Alloys resulting from treatment of hydrides |
| 1 | 50 | 29 | 1 | $MmNi_5$ |
| 2 | 50 | 27 | 1 | $MmNi_{4.9}Co_{0.1}$ |
| 3 | 50 | 24 | 1 | $MmNi_{4.0}Co_{1.0}$ |
| 4 | 50 | 9.2 | 1 | $MmNi_{3.0}Co_{2.0}$ |
| 5 | 50 | 6.8 | 1 | $MmNi_{2.5}Co_{2.5}$ |
| 6 | 50 | 4.2 | 1 | $MmNi_{2.0}Co_{3.0}$ |
| 7 | 50 | 3.1 | 1 | $MmNi_{1.0}Co_{4.0}$ |
| 8 | 50 | 3.0 | 1 | $MmNi_{0.1}Co_{4.9}$ |
| 9 | 50 | 2.5 | 1 | $MmCo_5$ |

Liberation of the occluded hydrogen from the hydrides was attained by heating the hydrides to a temperature exceeding room temperature or lowering the pressure.

EXAMPLE 2

Entirely the same alloys of $MmNi_{5-x}Co_x$ as used in Example 1 were activated by repeating the procedure of Example 1, except the purity of hydrogen was changed to 99.5%. Then at 20° C. under a hydrogen pressure slightly higher than the equilibrium pressure of the relevant hydride of alloy, hydrogen having a purity of 99.5% was introduced into the reactor to effect conversion of the alloy into a hydride. The results are shown in Table 3.

Table 3

| | $MmNi_{5-x}Co_x$ | $MmNi_{5-x}Co_xH_y$ | Temperature for formation of hydride (°C) | Equilibrium pressure at temperature of hydride formation (atm) | Pressure applied for conversion of alloy into hydride (atm) | Hydrogen content in hydride (% by weight) |
|---|---|---|---|---|---|---|
| 1 | $MmNi_5$ | $MmNi_5H_{6.5}$ | 20 | 14.0 | 30 | 1.48 |
| 2 | $MmNi_{4.9}Co_{0.1}$ | $MmNi_{4.9}Co_{0.1}H_{6.5}$ | 20 | 13.0 | 30 | 1.48 |
| 3 | $MmNi_{4.0}Co_{1.0}$ | $MmNi_{4.0}Co_{1.0}H_{6.3}$ | 20 | 10.0 | 20 | 1.43 |
| 4 | $MmNi_{3.0}Co_{2.0}$ | $MmNi_{3.0}Co_{2.0}H_{6.3}$ | 20 | 4.3 | 9 | 1.43 |
| 5 | $MmNi_{2.5}Co_{2.5}$ | $MmNi_{2.5}Co_{2.5}H_{5.2}$ | 20 | 3.3 | 8 | 1.18 |
| 6 | $MmNi_{2.0}Co_{3.0}$ | $MmNi_{2.0}Co_{3.0}H_{5.0}$ | 20 | 3.0 | 8 | 1.14 |
| 7 | $MmNi_{1.0}Co_{4.0}$ | $MmNi_{1.0}Co_{4.0}H_{4.8}$ | 20 | 2.9 | 8 | 1.09 |
| 8 | $MmNi_{0.1}Co_{4.9}$ | $MmNi_{0.1}Co_{4.9}H_{4.6}$ | 20 | 2.0 | 5 | 1.05 |
| 9 | $MmCo_5$ | $MmCo_5H_{3.0}$ | 20 | 0.8 | 5 | 0.69 |

The hydrides shown in Table 3 were treated by heating or by lowering pressure or both to effect liberation of hydrogen. The conditions of the treatment and the results of the treatment are shown in Table 4.

Table 4

| | Conditions of treatment | | | |
|---|---|---|---|---|
| | Temperature (°C) | Pressure (atm) | Time (min) | Alloys resulting from treatment of hydrides |
| 1 | 50 | 29 | 1 | $MmNi_5$ |
| 2 | 50 | 27 | 1 | $MmNi_{4.9}Co_{0.1}$ |
| 3 | 50 | 24 | 1 | $MmNi_{4.0}Co_{1.0}$ |
| 4 | 50 | 9.2 | 1 | $MmNi_{3.0}Co_{2.0}$ |
| 5 | 50 | 6.8 | 1 | $MmNi_{2.5}Co_{2.5}$ |
| 6 | 50 | 4.2 | 1 | $MmNi_{2.0}Co_{3.0}$ |
| 7 | 50 | 3.1 | 1 | $MmNi_{1.0}Co_{4.0}$ |
| 8 | 50 | 3.0 | 1 | $MmNi_{0.1}Co_{4.9}$ |
| 9 | 50 | 2.5 | 1 | $MmCo_5$ |

The results indicate that desired liberation of hydrogen from the hydrides could be obtained by heating the hydrides to a temperature exceeding room temperature or lowering the pressure.

EXAMPLE 3

The alloys of the formula $MmNi_{5-x}Co_x$ (wherein, Mm and X have the same meanings as those in Example 1) were prepared by following the procedure of Example 1. They were activated by use of hydrogen having a purity of 99.5%. The activated alloys were each subjected to a total of 100 cycles of occlusion and liberation of hydrogen by way of performance test. The hydrides, $MmNi_{5-x}Co_xH_y$, which were obtained after this test were found to have entirely the same compositions as those indicated in Table 1 of Example 1 above.

Table 5

| Hydride obtained after the first occlusion of hydrogen | Hydride obtained after the 50th occlusion of hydrogen | Hydride obtained after the 100th occlusion of hydrogen |
|---|---|---|
| $MmNi_{2.5}Co_{2.5}H_{5.2}$ | $MmNi_{2.5}Co_{2.5}H_{5.2}$ | $MmNi_{2.5}Co_{2.5}H_{5.2}$ |

From the results obtained in Examples 1, 2 and 3 described above, it is found that the purity of hydrogen had substantially no effect on the occlusion or liberation so far as it exceeded 99.5% and that repetitions of occlusion and liberation had virtually no effect upon the properties of alloys.

What is claimed is:

1. An alloy for the occlusion of hydrogen, which alloy is represented by the generic formula: $MmNi_{5-X}Co_X$, wherein Mm represents Mischmetal and X a number having the value of from 0.1 to 4.9, Mm containing, by weight, 25 to 30% of La, 40 to 45% of Ce, 10 to 15% of Pr, 4 to 5% of Nd, 4 to 7% of Sm+Gd, 3 to 5% of Fe, 0.1 to 1% of Si, 0.1 to 2% of Mg and 0.1 to 1% of Al.

2. The alloy according to claim 1, wherein X has a value of 2.0.

3. The alloy according to claim 1, wherein X has a value of 2.5.

4. The alloy according to claim 1, wherein X has a value of 3.0.

* * * * *